United States Patent
Piersol et al.

(10) Patent No.: US 8,711,372 B2
(45) Date of Patent: Apr. 29, 2014

(54) TECHNIQUES FOR IMAGE SEGMENT ACCUMULATION IN DOCUMENT RENDERING

(75) Inventors: Kurt W. Piersol, Campbell, CA (US); Martin Boliek, San Francisco, CA (US)

(73) Assignee: Ricoh Co., Ltd., Tokyo (JP)

( * ) Notice: Subject to any disclaimer, the term of this patent is extended or adjusted under 35 U.S.C. 154(b) by 1228 days.

(21) Appl. No.: 11/515,241

(22) Filed: Aug. 31, 2006

(65) Prior Publication Data

US 2008/0055623 A1 Mar. 6, 2008

(51) Int. Cl.
*G06F 3/12* (2006.01)

(52) U.S. Cl.
USPC ......... 358/1.13; 358/1.17; 358/1.15; 358/1.9; 382/251; 382/239; 382/254; 382/171

(58) Field of Classification Search
USPC .............. 375/240.14; 382/239, 254, 232; 358/1.18, 1.9, 1.15, 1.13
See application file for complete search history.

(56) References Cited

U.S. PATENT DOCUMENTS

| | | | | |
|---|---|---|---|---|
| 5,237,397 A * | 8/1993 | Mighdoll et al. | ......... | 375/240.25 |
| 5,416,603 A * | 5/1995 | Suzuki et al. | ............ | 358/426.02 |
| 5,467,413 A * | 11/1995 | Barrett | .......................... | 382/236 |
| 5,583,953 A * | 12/1996 | Harrington | .................... | 382/239 |
| 5,644,406 A * | 7/1997 | Harrington et al. | ............ | 382/239 |
| 5,649,052 A * | 7/1997 | Kim | .............................. | 704/226 |
| 5,652,711 A * | 7/1997 | Vennekens | .................... | 358/1.17 |
| 5,768,489 A * | 6/1998 | Adachi et al. | ................. | 358/1.18 |
| 6,020,979 A * | 2/2000 | Zeck et al. | ..................... | 358/1.9 |
| 6,023,558 A * | 2/2000 | Grabowski | ...................... | 358/1.9 |
| 6,100,998 A * | 8/2000 | Nagao et al. | .................... | 358/1.9 |
| 6,175,650 B1 * | 1/2001 | Sindhu et al. | .................. | 382/171 |
| 6,219,149 B1 * | 4/2001 | Kawata et al. | .................. | 358/1.15 |
| 6,243,172 B1 * | 6/2001 | Gauthier et al. | ............. | 358/1.18 |
| 6,510,247 B1 * | 1/2003 | Ordentlich et al. | ........... | 382/232 |
| 6,625,215 B1 * | 9/2003 | Faryar et al. | ............. | 375/240.14 |
| 6,690,837 B1 * | 2/2004 | Broddin et al. | ............... | 382/254 |
| 7,095,521 B2 * | 8/2006 | Yoshida | ....................... | 358/1.15 |
| 7,194,140 B2 * | 3/2007 | Ito et al. | ........................ | 382/251 |
| 7,369,065 B2 * | 5/2008 | Mitchell et al. | ................. | 341/50 |
| 7,373,000 B2 * | 5/2008 | Ozawa et al. | ................. | 382/232 |
| 2004/0227963 A1 * | 11/2004 | Jacobsen et al. | ............... | 358/1.9 |
| 2005/0116963 A1 * | 6/2005 | Bourdev et al. | ............... | 345/619 |
| 2005/0246684 A1 | 11/2005 | Shiraishi | | |
| 2006/0290961 A1 | 12/2006 | Low et al. | | |

OTHER PUBLICATIONS

European Search Report for European Application No. EP 07 11 5309, Mailed on Apr. 16, 2008, 11 pgs.

* cited by examiner

*Primary Examiner* — David K. Moore
*Assistant Examiner* — Ashish K Thomas
(74) *Attorney, Agent, or Firm* — Blakely, Sokoloff, Taylor & Zafman LLP

(57) ABSTRACT

A method and apparatus is disclosed herein for image processing. In one embodiment, the method comprises performing an analysis corresponding to a sequence of drawing commands that create a bit-map when executed and generating a set of image segments based on the analysis corresponding to the sequence of drawing commands.

31 Claims, 7 Drawing Sheets

FIG. 7A
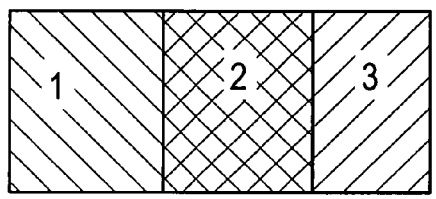
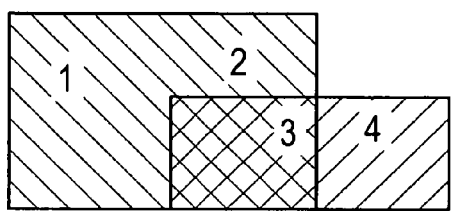
FIG. 7B
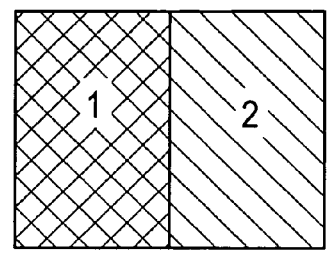
FIG. 7C
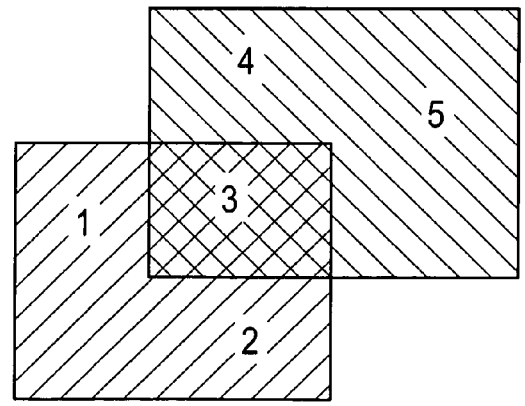
FIG. 7D

TECHNIQUES FOR IMAGE SEGMENT ACCUMULATION IN DOCUMENT RENDERING

FIELD OF THE INVENTION

The present invention relates to the field of image segmentation; more particularly, the present invention relates to converting drawing commands (e.g., page description languages) into another representation.

BACKGROUND OF THE INVENTION

Standard document rendering systems often use page description languages to specify how marks are to be placed in a target representation. In the case of printers, the target representation is a bit map that can be used by a marking engine to deposit toner on paper. In the case of a plotter, the target representation is a series of instructions to a robotic pen, which will deposit ink on paper. In the case of a PDF renderer, the page description language is translated into a series of drawing commands that can be used by another rendering program at a later time.

Such page description languages fall into two broad categories: rasters and drawings systems. Rasters are by far the simpler of the two, consisting of a set of pixel values that are arrayed in rows and columns, and the pixel values are written onto the page according to a color model. Drawing systems are more complex, allowing various types of imaging operations such as line and curve drawing, color filling, coordinate transformations, and placement of rasters. As such, they are generally a superset of raster page descriptions. However, they also can be transformed into raster descriptions once a resolution and size have been chosen.

Drawing systems may include drawing commands that overwrite the same pixel with different values. Various algorithms can be chosen for resolving such conflicting commands in the final page image raster. The most common, and intuitive, of these models is the so-called "painter's algorithm", which uses the results of the most recently issued drawing command as the proper pixel value. For example, if three lines are drawn into the same image, the color of the most recent line will dictate what the pixel value will be for any pixel where the lines intersect. A slight expansion of the painter's algorithm involves assigning an "alpha" value to each pixel being drawn by a command, which indicates a level of transparency for the pixel data. A 50% alpha value would take the previous pixel value, and the new pixel value, and produce a color composed by a mathematical mixing of the existing and new pixel values.

JPM is an image format that includes both raster elements and a very simple drawing system. The JPM drawing system allow placement, scaling, and masking of elements. Like the drawing systems discussed above, it includes alpha blending of placed images.

Significant prior art in the area of image segmentation for mixed raster content documents exists. These are limited to segments that worked from scanned images. U.S. Publication No. 20050116963 A1, entitled "Processing Complex Regions of Illustration Artwork," filed Jan. 4, 2005, discloses the construction of planar maps given complex lists of drawing commands. However, the prior art techniques are used to speed rasterizers by flattening complex areas.

SUMMARY OF THE INVENTION

A method and apparatus is disclosed herein for image processing. In one embodiment, the method comprises performing an analysis corresponding to a sequence of drawing commands that create a bit-map when executed and generating a set of image segments based on the analysis corresponding to the sequence of drawing commands.

DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIGS. 7A-7D illustrate example intersections between two rectangles.

DETAILED DESCRIPTION OF THE PRESENT INVENTION

Figure 1:
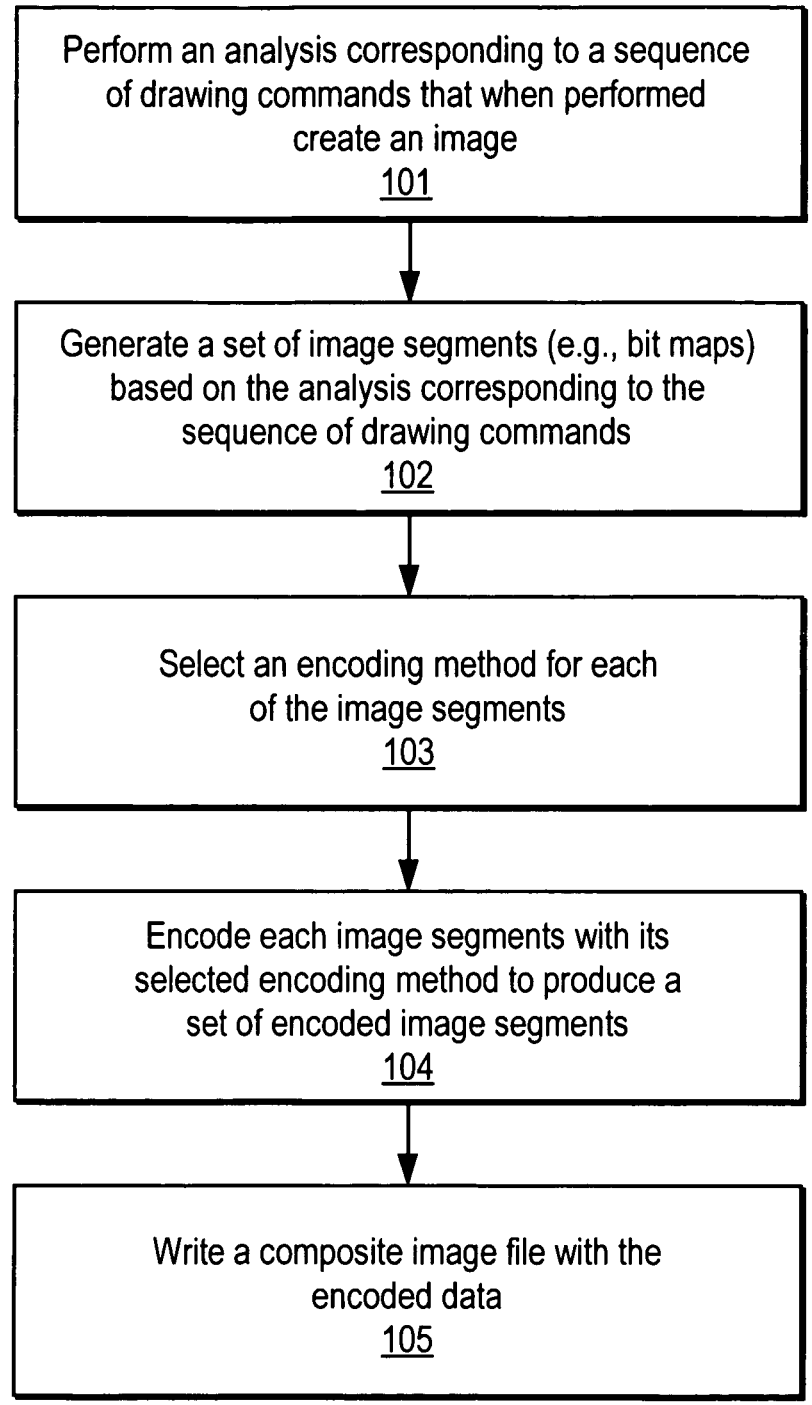
FIG. 1 is a flow diagram of one embodiment of a process for handling a sequence of drawing commands.

Embodiments of the present invention include techniques for converting drawing commands (e.g., page description languages) into another representation. In one embodiment, the drawing commands are converted into JPM images, which are more efficient. In one embodiment, the conversion is based on geometric extents of the drawing commands. In another embodiment, the conversion is based on the sequence of the drawing commands and the drawing operator. In both cases, decisions are made based on the bit-map created when a drawing command is executed. In these cases, the bit-map is a result of the execution of the drawing command.

Note that in the following, the terms "instructions", "command" with "operation" are used interchangeably.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

Embodiments of the present invention convert drawing commands into another representation (e.g., a JPM image representation). In one embodiment, the drawing commands art part of a page description language. In one embodiment, a page description language with a sophisticated drawing system, such as Adobe's PostScript language, is used, and the page description language is converted into a JPM image representation, or any other mixed raster content format. For example, PDF can be used as a mixed raster representation by simply avoiding any drawing commands other than the image placement.

In one embodiment, the drawing language is resolvable into a series of temporally ordered drawing instruction tuples (operations), which include an operation code (opcode) and may include one or more additional operands that make the operation specific. For example, the Adobe PostScript language has operators that draw spline curves (of which straight lines are a subset), fill spline curves with a color, place raster images, and draw text. The "fillrect" operator accepts operands that specify the position and extent of the rectangle on a page. Once resolved into instructions, these instructions may be used to generate the new representation.

In one embodiment, the image representation is chosen to be a JPM document. JPM documents can have arbitrary complexity, but the complexity of choosing the pixel value for any particular raster location (x,y) is an operation of order n, where the n is the number of images whose extent overlaps with that location. Therefore, it is efficient to choose an image representation that gives the correct value and uses the smallest number of bitmaps in any given area.

In another embodiment, the semantic meaning of the drawing commands are used to help choose a good set of component image representations.

Once a set of component image representations has been selected, they are individually encoded. To take advantage of the fact that some image encoding algorithms give better compression, with lower image distortion, for certain kinds of images, an embodiment of the present invention selects an encoding algorithm for each component image representation. For example, JBIG compression gives excellent results for images that have only two color values. Therefore, in cases where an image segment has only two color values, JBIG or JBIG2 compression may be selected to encode that image segment. Similarly, JPEG 2000 gives superior results for continuous-tone images. Therefore, in cases where an image segment is a continuous-tone image, JPEG 2000 compression may be selected to encode that image segment.

The appropriate number of images is chosen with an appropriate image encoding. In one embodiment, the smallest number of bitmaps is shown, each with the best available encoding.

FIG. 1 is a flow diagram of one embodiment of a process for handling a sequence of drawing commands and generating a new representation. The process is performed by processing logic that may comprise hardware (circuitry, dedicated logic, etc.), software (such as is run on a general purpose computer system or a dedicated machine), or a combination of both.

Referring to FIG. 1, the process begins by performing an analysis corresponding to a sequence of drawing commands that when performed create an image (processing block 101). After performing the analysis on the sequence of drawing commands, processing logic generates a set of image segments (e.g., bit maps) based on the analysis corresponding to the sequence of drawing commands (processing block 102). In one embodiment, the generation of the set of image segments is based on analysis of the drawing commands themselves. In another embodiment, the generation of the set of image segments is based on results of the sequence of drawing commands.

After generating the image segments, processing logic selects an encoding method for each of the image segments (processing block 103). In one embodiment, the selection of the encoding method is based on based on analysis of the drawing commands themselves. In another embodiment, the selection of the encoding method is based on results of the sequence of drawing commands. In yet another embodiment, the selection of the encoding method is based on decoder resource availability. In still yet another embodiment, the selection of the encoding method is based on an amount of achievable compression.

After selecting the encoding method(s), processing logic encodes each image segments with its selected encoding method to produce a set of encoded image segments (processing block 104).

Once encoded, in one embodiment, processing logic writes a composite image file with the encoded data (processing block 105). In one embodiment, the composite image file is a JPM file. In another embodiment, the composite image file is a PDF file.

In one embodiment, processing logic performs the analysis corresponding to the sequence of drawing commands by classifying each commands into groups as each command in the sequence is examined in sequence, and then, for each of the commands, adding their result to an electronic version of one drawing (e.g., bitmap) that exists if that command is in the same group as a command that immediately preceded it in the sequence, and if that command is not in the same group as a command that immediately preceded it in the sequence, then saving that drawing and creating an electronic version of another drawing (e.g., bitmap) using the result of that command. In such a case, the electronic versions of these drawings are the image segments.

In another embodiment, processing logic performs the analysis corresponding to the sequence of drawing commands by classifying each of the commands into groups as each command in the sequence is examined (in sequence), generating a first bitmap for a first of the groups of one or more drawing commands, saving the first bitmap when the all drawing commands in the first group have been analyzed, and creating a second bitmap for a second of the groups of one or more drawing commands. In such a case, in one embodiment, the process further includes saving the second bitmap after all drawing commands in the second group have been analyzed.

In yet another embodiment, processing logic performs the analysis corresponding to the sequence of drawing commands by determining a geometric impact of each drawing command on each of multiple regions (e.g., a rectangular tile) that combined together form the image. In such a case, each image segment corresponds to image data for one of the regions. In one embodiment, the geometric impact comprises the color associated with that drawing command. Also in such a case, the selection of the encoding to use for each image segment is based on image data for its associated region. In one embodiment, the selection is based on a number of colors in its region after the geometric impact of all of the drawing commands has been determined for the regions.

In yet another embodiment, processing logic performs the analysis corresponding sequence of drawing commands by performing the following operations for each of the drawing commands: determining a list of colors generated by a result of each drawing command, determining a list of tiles intersected by the result of that drawing command, adding the list of colors to tag each tile in the list of tiles intersected by the result of that drawing command, and copying result bits to tiles in the list of tiles intersected by the result of that drawing command. In such an embodiment, the selection of the method of encoding to use for each image segment is based on image data for its associated region.

In yet another embodiment, processing logic performs the analysis corresponding sequence of drawing commands by performing the following operations for each of the drawing commands: determining a list of colors generated by each drawing command, determining a bounding box to encompass a result of performing that drawing command, creating a tile bitmap associated with that drawing command, and copying bits that would result from execution of that drawing command to bit maps affected by that drawing command, including tagging the tile bitmap with the list of colors. The tiles are tagged to be able to identify their type in the future. In one embodiment, all affected tiles are tagged. An empty-tile bit may be used to specify an empty tile. Those tiles with an empty-tile bit indicating an empty tile would not have to be tagged.

In an alternative embodiment in which the encoding is not performed, processing logic may write a composite image file with the image segments (e.g., bitmaps) generated as part of the process.

Figure 2:
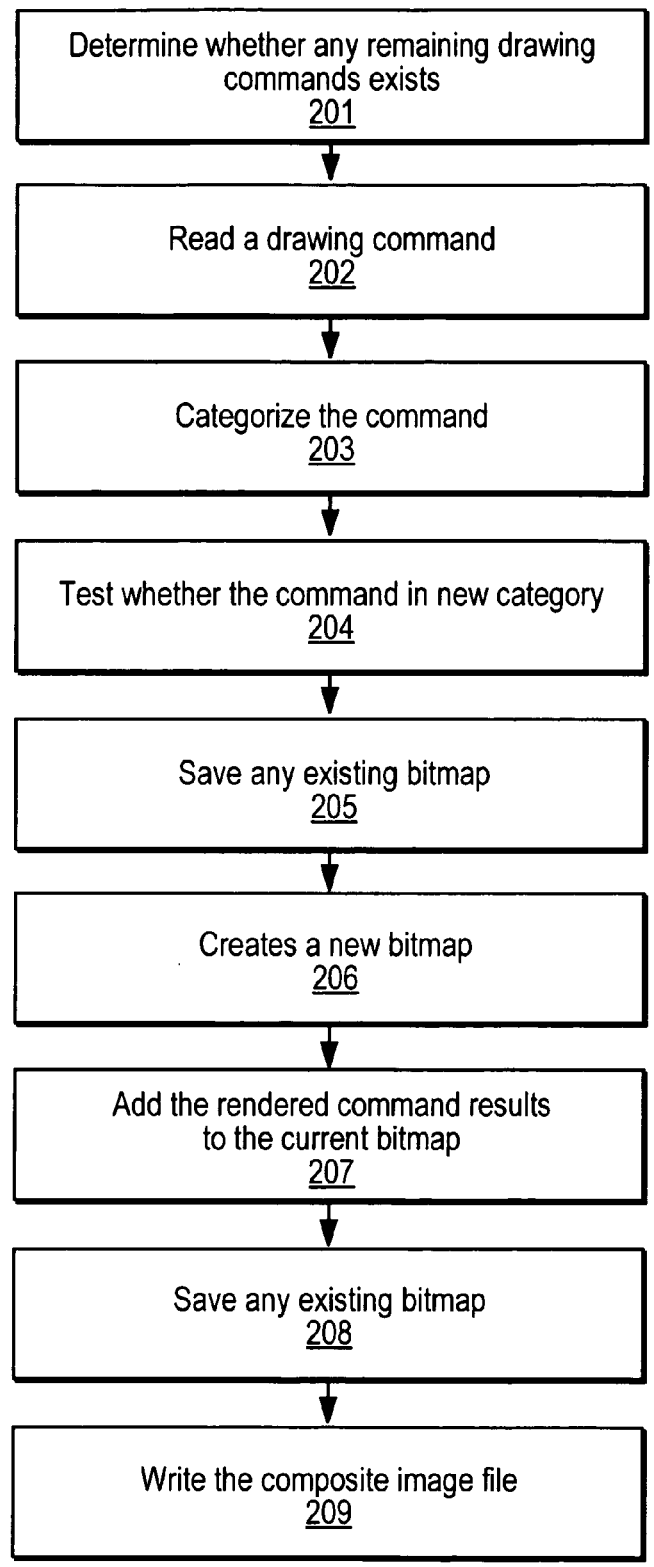
FIG. 2 is a flow diagram of another embodiment of a process for handling a sequence of drawing commands.

In one embodiment, after processing logic performs the analysis of the drawing commands, selection of the encoding technique to use is performed. FIG. 2 is a flow diagram of another embodiment of a process for handling a sequence of drawing commands. The process is performed by processing logic that may comprise hardware (circuitry, dedicated logic, etc.), software (such as is run on a general purpose computer system or a dedicated machine), or a combination of both.

Referring to FIG. 2, the process begins by processing logic performing an analysis corresponding to a sequence of drawing commands (processing block 201). Then, processing logic selects an encoding for each of multiple image segments based on the analysis corresponding to a sequence of drawing commands (processing block 202). In one embodiment, selecting the encoding for each image segment is based on which encoding produces the best compression. In another embodiment, selecting the encoding for each image segment is based on impact of each of the sequence of drawing commands in a region represented by that image segment.

As mentioned above, there are several distinct embodiments of processes that read an instruction stream (e.g., a sequence of drawing commands) and accumulate a bitmap into another format (e.g., JPM format). One such algorithm uses a temporal segmentation, and others use varying forms of geometric segmentation. Each of these will be discussed in more detail below.

A Sequential Algorithm

In one embodiment, using a sequential process, a drawing is segmented by a sequential sequence of operations. In one embodiment, the operations are divided into classes, based on type. A simple set of classes is chosen in one embodiment. A class of "text drawing" operations is also defined, "image placement" operations, "state setting", and "general drawing" operations. In one embodiment, these classes are defined in terms their opcode. In another embodiment, both the opcode and the data type of the operands are used. For purposes of discussion, note that operations can be divided into classes. In one embodiment, a "NULL" operation class, which contains no actual operations, is implicitly inserted at the beginning and end of each page. The "NULL" operation enables the segmentation algorithm to synchronize, at a place where a known state (e.g., beginning) exists.

In the temporal process, processing logic generates a series of overlapping images that can be composed into a correct final image. As an operation in the sequence of operations is examined, a new image/mask pair is generated whenever the class of operation is different from the previous operation. When a difference is detected, any existing image/mask pair is finalized and added it to the final image. Then, a new image/mask pair based on the new operation is created.

Figure 3:
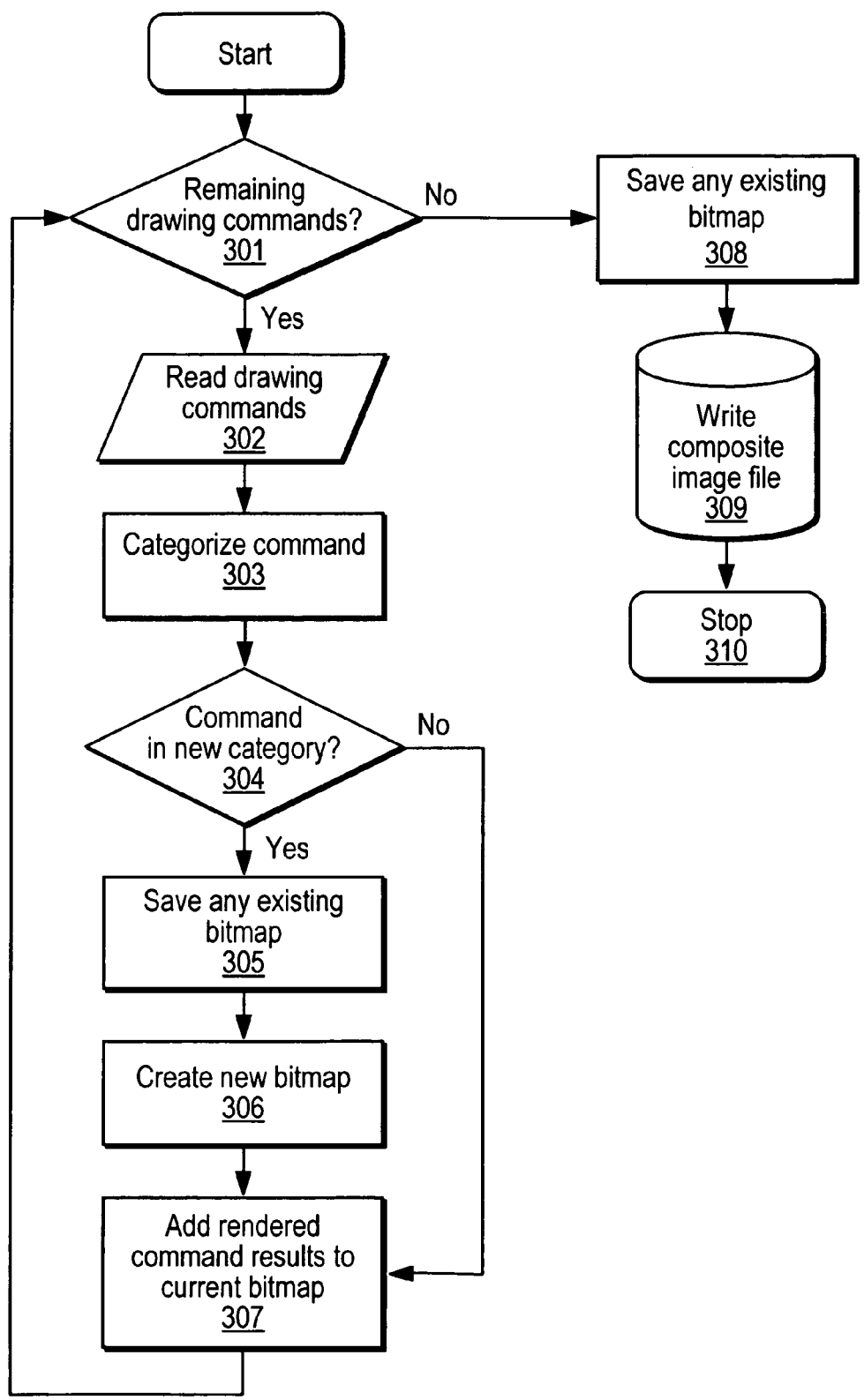
FIG. 3 is a flow diagram of one embodiment of a process for temporal segmentation.

FIG. 3 is a flow diagram of one embodiment of a process for sequential segmentation. The process is performed by processing logic that may comprise hardware circuitry, dedicated logic, etc.), software (such as is run on a general purpose computer system or a machine), or a combination of both.

Referring to FIG. 3, the process begins by processing logic determines whether any remaining drawing commands exists (processing block 301). If so, processing logic reads a drawing command (processing block 302), and categorizes the command (processing block 303). Processing logic also tests whether the command in new category (processing block 304). If so, processing logic saves any existing bitmap (processing block 305), creates a new bitmap processing block 206), and adds the rendered command results to the current bitmap (processing block 307). If the command is not in a new category, processing logic transitions directly to processing block 307. After adding rendering the commands result to the current bitmap, processing transitions to processing block 301 and the processing repeats.

If there are no remaining drawing commands, processing logic saves any existing bitmap (processing block 308) and writes the composite image file (e.g., a JPM file, a PDF file) processing block 309). Thereafter, the process stops.

An example using the sequential segmentation process is given below using the following operations:

NULL
Draw circle of radius 100 at 100, 100
Draw text "abc" at 100, 100
Draw text "def" at 100, 120
Set drawing color to "red"
Draw text "ghi" at 100, 140
Draw image "myimage" at 300, 300
NULL Applying the temporal processing to the set of operations given above generates 4 image/mask pairs, segmented as follows:

| | |
|---|---|
| NULL | |
| Create new bitmap to be compressed with JBIG encoding | Image 1 |
| Draw circle of radius 100 at 100, 100 | |
| Create new bitmap to be compressed with JBIG encoding | Image 2 |
| Draw text "abc" at 100, 100 | |
| Draw text "def" at 100, 120 | |
| Create new bitmap to be compressed with JBIG encoding | Image 3 |
| Set drawing color to "red" | |
| Create new bitmap to be compressed with JBIG encoding | empty image discarded - still Image 3 |
| Draw text "ghi" at 100, 140 | |
| Create new bitmap to be compressed with JPEG2000 encoding | Image 4 |
| Draw image "myimage" at 300, 300 | |
| NULL | |

A Grid-Based Geometric Algorithm

In one embodiment of the grid-based geometric process, a set of tiles images is created by examining the stream of operations and determining where particular pixel values are written into particular image tiles.

As above, the operations in the instruction stream are segmented into classes. In one embodiment, the classes are based on the colors of pixels that are drawn by the operation. The class of the operation is the set of all pixel values that are produced by the operation. In one embodiment, the class of an operation is dependent on previous operations, as in the case of the "set drawing color" operation in the example noted above. In such a case, a black and white image might have a set of pixel values (0,1), while a color image might have a long list of pixel values (1, 28, 29, 123, . . . ) in its image class.

The final raster is divided into tiles of a fixed width and height. In one embodiment, the tiles form a regular grid. In one embodiment, each tile has a class assigned to it, which is also a set of pixel values. When a new page has begun, each tile's class is initialized with an empty set of pixel values. As each operation is processed, tiles that can possible affect the operation are computed. For each such tile, a class for the tile is computed based on the union of its current class and the operation class.

At image encoding time, an encoding for the tile is chosen based on the class of the title. In one embodiment, for tiles whose class contains only two colors, JBIG encoding is chosen; for tiles whose class is an empty set, no image is encoded; and for times whose class contains more than two colors, JPEG 2000 is chosen for encoding. Also, in another embodiment, if one of the classes correlates to a continuous-tone image, JPEG 2000 is chosen for encoding. In yet another embodiment, JPEG is chosen for encoding.

Figure 4:
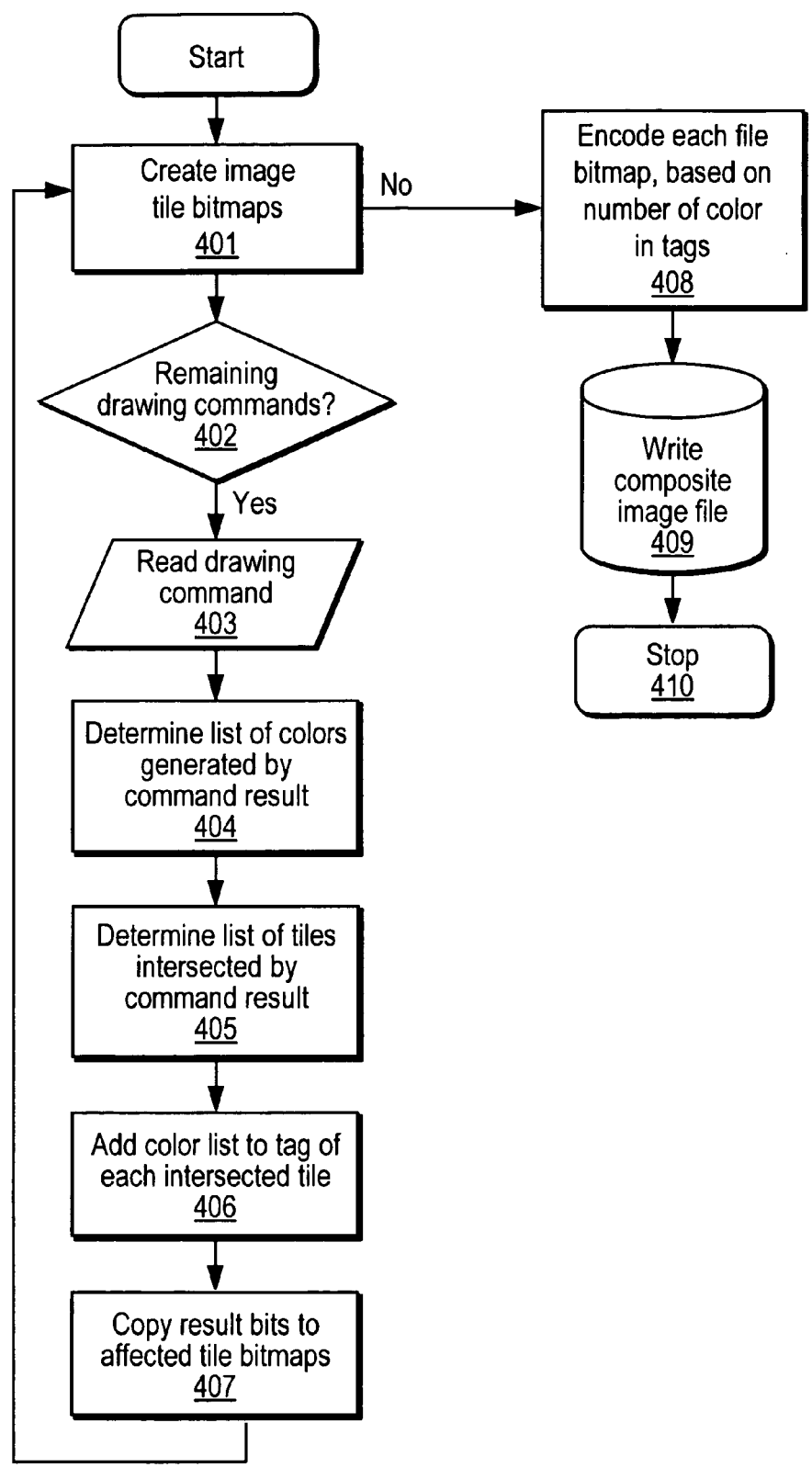
FIG. 4 is a flow diagram of one embodiment of a grid-based geometric segmentation process.

FIG. 4 is a flow diagram of one embodiment of a grid-based geometric segmentation process. The process is performed by processing logic that may comprise hardware circuitry, dedicated logic, etc.), software (such as is run on a general purpose computer system or a dedicated machine), or a combination of both.

Referring to FIG. 4, the process begins by processing logic creating multiple image tile bitmaps (processing block 401). Processing logic then determines whether there are any remaining drawing commands (processing block 402). If so, processing logic reads a drawing command (processing block 403), determines a list of colors generated by the command result (processing block 404), determines a list of tiles that are intersected by the result of the command (i.e., the tiles affected by the result) (processing block 405), adds a color list to the tag of each of the intersected tiles (processing block 406), and copies bits from the results of the command to affected tile bitmaps (processing block 407). The results are obtained by executing the drawing command. Thereafter, processing transitions to processing block 402 where the process repeats.

If processing logic encodes each tile bitmap based on number of color in tags processing block 408) and writes a composite image file (processing block 409). Thereafter, processing ends.

A Free-Form Geometric Segmentation Algorithm

Another embodiment of the process of converting a sequence of drawing commands to another representation uses geometric segmentation. In this case, the final raster is treated as having tiles of varying size. As in the grid-based geometric technique described above, the classes of operation are computed based on pixel values.

The drawing operations are handled in an order. When the first operation is examined, a rectangular tile is produced. The extent of the rectangular tile is defined by the bounding box of the operation. This tile is assigned a class that is identical to the class of the operation.

For all succeeding operations, the class and a potential tile for the operation are computed. Possibly, the existing tiles having bounding boxes that intersect the potential tile are detected. For each area of overlap, the union of the existing tile class and the potential tile class is computed. If the new class differs from the existing tile class, the existing tile is divided into a number of tiles, depending on the particulars of the overlap between the existing and potential tiles. In one embodiment, the existing tile is broken into two to five tiles. In one embodiment, the number of tiles they are divided into is based on the number of new non-intersecting rectangular segments created by the intersection of two rectangular regions. The number of new non-intersecting rectangular segments created by the intersection of two rectangular regions is determined by how those regions intersect. FIGS. 7A-7D illustrate some example intersections. Referring to FIGS. 7A-7D, rectangles with orthogonal crosshatching intersect, with the intersection shown with the criss-cross pattern. As shown, there are the 2 to 5 new non-intersecting rectangular segments they create (ignoring the trivial complete intersection). Each tile is assigned a new class, based on the union of colors contained within that tile. If the union differs from the potential tile class, then the potential tile is itself broken into a number (e.g., two to five) new potential tiles. Each of the new potential tiles is checked for overlap with other tiles. Since existing tiles are not permitted to overlap, there is no need to recheck any potential tiles against any existing tiles that have previously been checked for overlap. Note that a one-to-one mapping does not always require a new tile.

As with the grid-based method, after processing all the drawing operations, encoding for a given tile is chosen based on the number of colors contained in the tile class.

Figure 5:
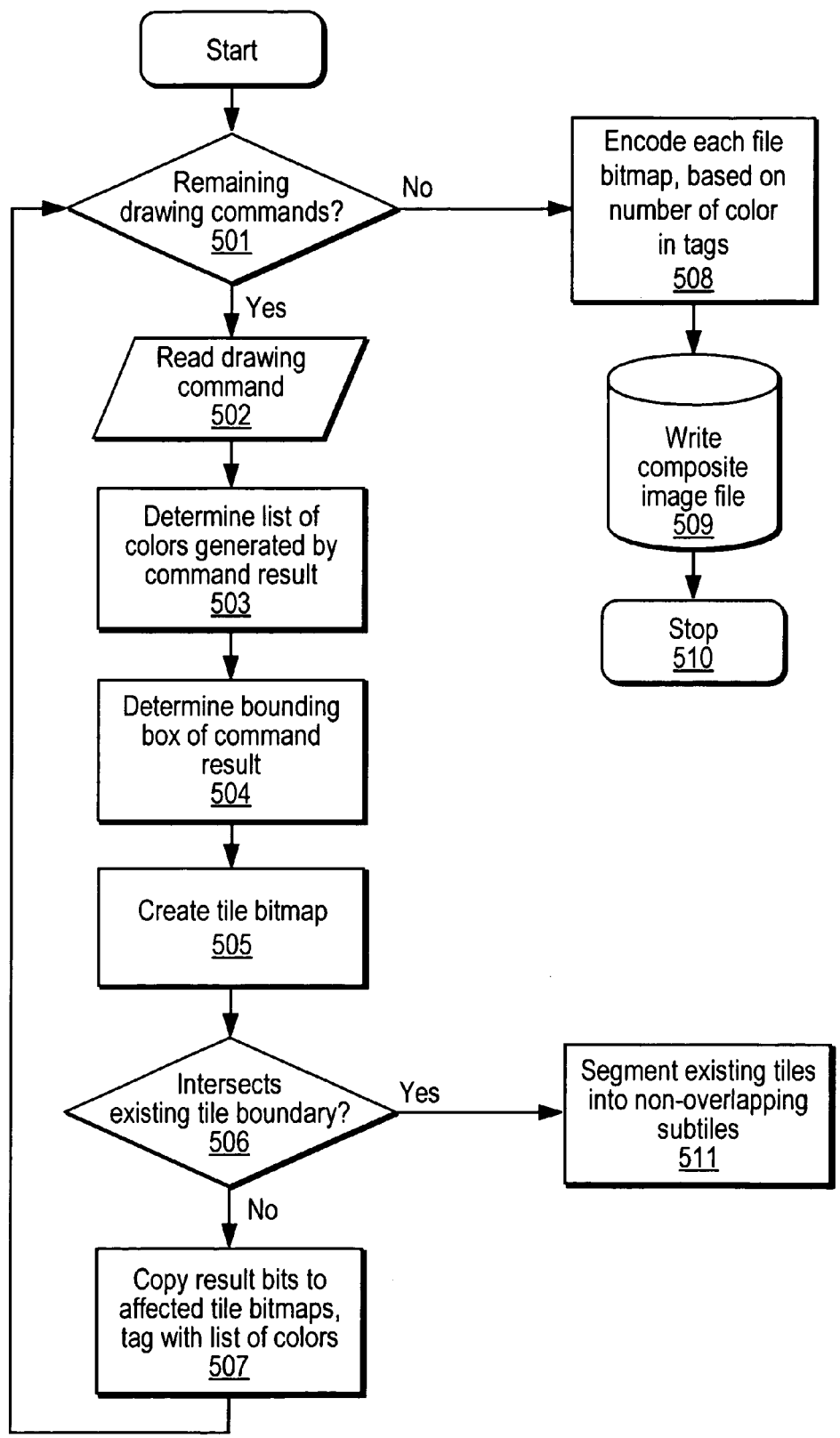
FIG. 5 is a flow diagram of one embodiment of a free-form geometric segmentation process.

FIG. 5 is a flow diagram of one embodiment of a free-form geometric segmentation process. The process is performed by processing logic that may comprise hardware circuitry, dedicated logic, etc.), software (such as is run on a general purpose computer system or a dedicated machine), or a combination of both.

Referring to FIG. 5, the process begins by processing logic determining if any remaining drawing commands remain (processing block 501). If so, processing logic reads a drawing command (processing block 502), determines a list of colors generated by the result of execution of the drawing command (processing block 503), determines a bounding box of the result of the command (using the extent of the bit-map) (processing block 504), and creates a tile bitmap corresponding to the result of the command (processing block 505).

Next, processing logic tests whether the tile bitmap intersects existing tile boundary (processing block 506). If so, processing logic segments existing tiles into non-overlapping sub-tiles (processing block 511) and processing transitions to processing block 507. If not, processing logic transitions directly to processing block 507.

At processing block 507, processing logic copies the bits corresponding to the results of the drawing command to the affected tile bitmaps and sets the tags associated tile bitmaps with the list of colors (processing block 567) and then transitions to processing block 501.

If there are no remaining drawing commands, processing logic encodes each tile bitmap based on the number of colors in the tags (processing block 508) and writes the composite image file with encoded data corresponding to the tile bitmaps (e.g., a JPM file, a PDF file, etc.) (processing block 509). Thereafter, processing ends.

An Alternative Algorithm

Another embodiment may be used which is a variation of the algorithm that performs segmentation by drawing command. This technique is as follows: First, each (drawing command is classified by command type. Then, a page size bitmap and mask is created for each class. (The mask might be multiple bit if there is alpha blending necessary. In another embodiment, the individual masks are not created until the last step. A universal accounting for the ultimate contribution from each class bit-map for each pixel replaces the individual mask. The difference reduces to the way the arrays are addressed in memory). Therefore, all the drawing commands are executed in order. Also pixel values are placed in the correct class bit-map for each drawing command and all of the masks of all the classes for each pixel affected are updated. (The masking is going to replace the ordering of the drawing commands for determining which pixels are altered and which are occluded.)

A Combination of Two or More of the Algorithms

All of the above techniques could be combined in various ways. For example, a suitable constructed instruction stream could have remarkably bad results when temporally segmented, by alternating operation classes in ways which do not affect the end image but generate many unneeded image components. Combined free-form and temporal segmentation could recover almost all of the lost efficiency. In one embodiment, the image set produced by temporal segmentation is taken and a free-from geometric segmentation is run on the image portions, treating each image as an image placement drawing command.

As another example, geometric segmentation might lead to interesting edge effects segment boundaries, where encoding schemes introduce different kinds of distortion artifact. In one embodiment, temporal segmentation generates information that would help to sort out instances where some minor overlap would preserve visual clarity at a small expense in decoder efficiency.

An Example of a Computer System

Figure 6:
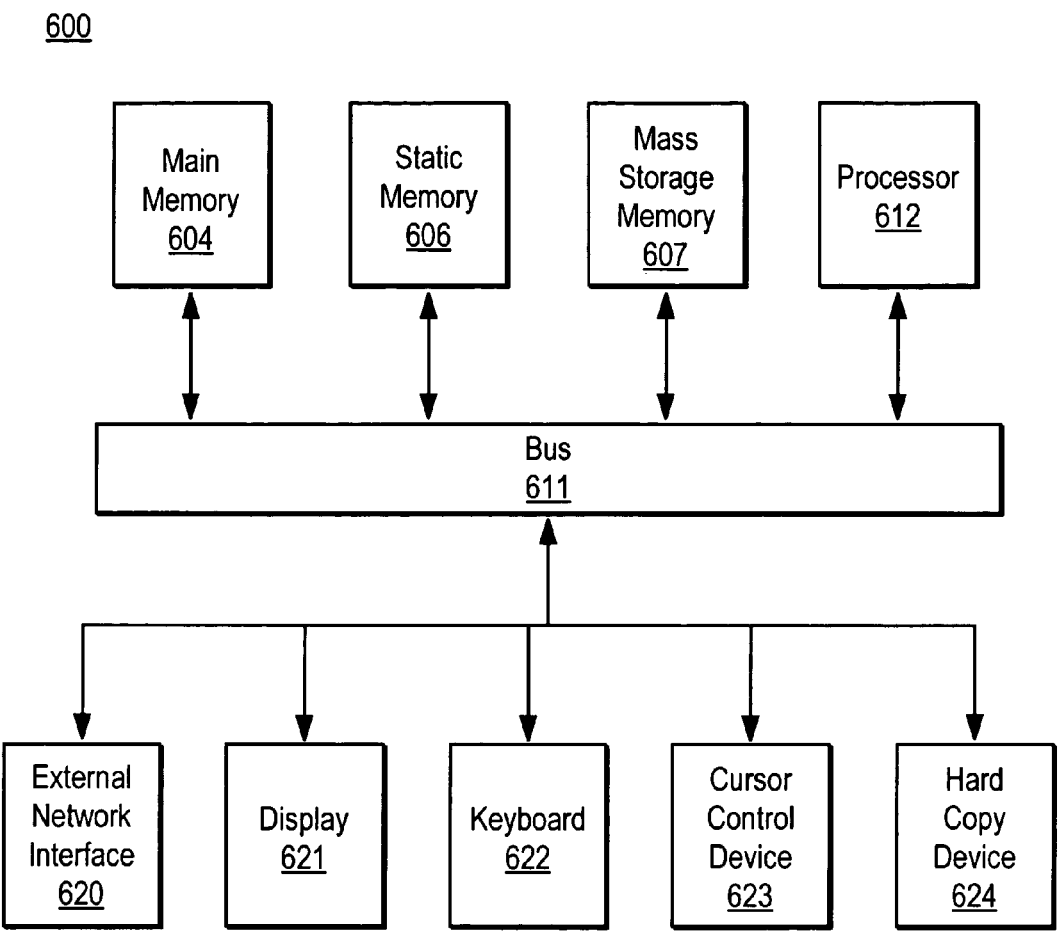
FIG. 6 is a block diagram of an example of a computer system that may perform one or more of the operations described herein.

FIG. 6 is a block diagram of an exemplary computer system that may perform one or more of the operations described herein. Referring to FIG. 6, computer system 600 may comprise an exemplary client or server computer system. Computer system 600 comprises a communication mechanism or bus 611 for communicating information, and a processor 612 coupled with bus 611 for processing information. Processor 612 includes a microprocessor, but is not limited to a microprocessor, such as, for example, Pentium™, PowerPC™, etc.

System 600 further comprises a random access memory (RAM), or other dynamic storage device 604 (referred to as main memory) coupled to bus 611 for storing information and instructions to be executed by processor 612. Main memory 604 also may be used for storing temporary variables or other intermediate information during execution of instructions by processor of 612.

Computer system 600 also comprises a read only memory (ROM) and/or other static storage device 606 coupled to bus 611 for storing static information and instructions for processor 612, and a data storage device 607, such as a magnetic disk or optical disk and its corresponding disk drive. Data storage device 607 is coupled to bus 611 for storing information and instructions.

Computer system 600 may further be coupled to a display device 621, such as a cathode ray tube (CRT) or liquid crystal display (LCD), coupled to bus 611 for displaying information to a computer user. An alphanumeric input device 622, including alphanumeric and other keys, may also be coupled to bus 611 for communicating information and command selections to processor 612. An additional user input device is cursor control 623, such as a mouse, trackball, trackpad, stylus, or cursor direction keys, coupled to bus 611 for communicating direction information and command selections to processor 612, and for controlling cursor movement on display 621.

Another device that may be coupled to bus 611 is hard copy device 624, which may be used for marking information on a medium such as paper, film, or similar types of media. Another device that may be coupled to bus 611 is a wired/wireless communication capability 625 to communication to a phone or handheld palm device.

Note that any or all of the components of system 600 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A computer-implemented method comprising:
   performing an analysis corresponding to a sequence of drawing commands from a drawing instruction stream that create a bit-map when executed, wherein performing the analysis corresponding to the sequence of drawing commands comprises classifying each of the commands into groups as each of the sequence of drawing commands are examined in sequence; and
   generating a set of image segments that group drawing commands from the sequence together for encoding, each image segment grouping one or more drawing commands to be encoded as a separate image based on drawing command type, where each of a plurality of different drawing command types is defined, at least in part, on a corresponding drawing command opcode, determined from the analysis of the sequence of drawing commands, wherein the generated set of image segments having one of a plurality of different encoding methods selected for each image segment in the set to achieve a highest level of compression with a least amount of distortion, the selection based on a drawing command type associated with each image segment, wherein generating the set of image segments further comprises:
     generating a first bitmap for a first of the groups of one or more drawing commands,
     saving the first bitmap when the all drawing commands in the first group have been analyzed, and
     creating a second bitmap for a second of the groups of one or more drawing commands.

2. The method defined in claim 1 wherein generating the set of image segments is based on analysis of the drawing commands themselves.

3. The method defined in claim 1 wherein generating the set of image segments is based on results of the sequence of drawing commands.

4. The method defined in claim 1 wherein each of the set of image segments comprises a set of bitmaps.

5. The method defined in claim 1 further comprising:
   selecting an encoding method for each of a plurality of image segments; and
   encoding each of the plurality of segments with a selected encoding method to produce a set of encoded image segments.

6. The method defined in claim 5 wherein selecting the encoding method is based on based on analysis of the drawing commands themselves.

7. The method defined in claim 5 wherein selecting the encoding method is based on results of the sequence of drawing commands.

8. The method defined in claim 5 wherein selecting the encoding method is based on decoder resource availability.

9. The method defined in claim 5 wherein selecting the encoding method is based on an amount of achievable compression.

10. The method defined in claim 1 further comprising saving the second bitmap after all drawing commands in the second group have been analyzed.

11. The method defined in claim 10 further comprising writing a composite image file with the first and second bitmaps.

12. The method defined in claim 1 wherein performing the analysis corresponding to the sequence of drawing commands comprises determining a geometric impact of each drawing command on each of a plurality of regions that combine together to form the image, and further wherein each of the plurality of image segments corresponds to image data for one of the plurality of regions, and further comprising:
   selecting an encoding for each of the plurality of image segments based on image data for its associated region.

13. The method defined in claim 12 wherein each of the plurality of regions comprises a rectangular tile.

14. The method defined in claim 12 wherein the geometric impact comprises the color associated with said each drawing command.

15. The method defined in claim 12 wherein selecting an encoding for each of the plurality of image segments is based on a number of colors in its region after the geometric impact of all of the plurality of drawing commands has been determined for the regions.

16. The method defined in claim 5, wherein the drawing instruction stream is in a first format and the produced set of encoded image segments are in a JPM format different from the first format.

17. A computer-implemented method comprising:
   performing an analysis corresponding to a sequence of drawing commands from a drawing instruction stream that create a bit-map when executed, wherein performing the analysis corresponding to the sequence of drawing commands comprises:
     classifying each of the commands into groups based at least in part on drawing command type as each of the sequence of drawing commands are examined in sequence,
     for each of the commands,
       adding a result of said each command to an electronic version of a first drawing that exists if said each command is in the same group based on drawing command type as a command that immediately precedes said each command in the sequence, and
       if said each command is not in the same group as a command that immediately precedes said each command in the sequence, then saving the first drawing and creating an electronic version of a second drawing using the result of said each command, where the electronic versions of the first and second drawings are the image segments; and
   generating a set of image segments that group drawing commands from the sequence together for encoding, each image segment grouping one or more drawing commands to be encoded as a separate image based on drawing command type, where each of a plurality of different drawing command types is defined, at least in part, on a corresponding drawing command opcode, determined from the analysis of the sequence of drawing commands, wherein the generated set of image segments having one of a plurality of different encoding methods selected for each image segment in the set to achieve a highest level of compression with a least amount of distortion, the selection based on a drawing command type associated with each image segment.

18. The method defined in claim 17 wherein the first and second drawings are bitmaps.

19. A computer-implemented method comprising:
performing an analysis corresponding to a sequence of drawing commands from a drawing instruction stream that create a bit-map when executed, wherein performing the analysis corresponding to the sequence of drawing commands comprises:
  for each of the drawing commands,
    determining a list of colors generated by a result of said each drawing command,
    determining a list of tiles intersected by the result of said each drawing command,
    adding the list of colors to tag each tile in the list of tiles intersected by the result of said each drawing command, and
    copying result bits to tiles in the list of tiles intersected by the result of said each drawing command; and
  generating a set of image segments that group drawing commands from the sequence together for encoding, each image segment grouping one or more drawing commands to be encoded as a separate image based on drawing command type, where each of a plurality of different drawing command types is defined, at least in part, on a corresponding drawing command opcode, determined from the analysis of the sequence of drawing commands, wherein the generated set of image segments having one of a plurality of different encoding methods selected for each image segment in the set to achieve a highest level of compression with a least amount of distortion, the selection based on a drawing command type associated with each image segment, and further comprising selecting the encoding for each of the plurality of image segments based at least in part on image data for its associated region.

20. A computer-implemented method comprising:
performing an analysis corresponding to a sequence of drawing commands from a drawing instruction stream that create a bit-map when executed, wherein performing the analysis corresponding to the sequence of drawing commands comprises, for each of the drawing commands,
  determining a list of colors generated by said each drawing command;
  determining a bounding box to encompass a result of performing said each drawing command;
  creating a tile bitmap associated with said each drawing command; and
  copying bits that would result from execution of said each drawing command to bit maps affected by said each drawing command, including tagging the tile bitmap with the list of colors; and
generating a set of image segments that group drawing commands from the sequence together for encoding, each image segment grouping one or more drawing commands to be encoded as a separate image based on drawing command type, where each of a plurality of different drawing command types is defined, at least in part, on a corresponding drawing command opcode, determined from the analysis of the sequence of drawing commands, wherein the generated set of image segments having one of a plurality of different encoding methods selected for each image segment in the set to achieve a highest level of compression with a least amount of distortion, the selection based on a drawing command type associated with each image segment.

21. The method defined in claim 20 further comprising:
determining whether the bitmap intersects an existing tile boundary; and
segmenting existing tiles into non-overlapping sub-tiles if the bitmap intersects an existing tile boundary.

22. The method defined in claim 20 further comprising:
encoding each tile bitmap based on a number of colors in the tags; and
writing a composite image file with encoded data corresponding to the tile bitmaps.

23. A non-transitory computer readable storage medium storing instructions thereon which, when executed by a system, causes the system to perform a method comprising:
performing an analysis corresponding to a sequence of drawing commands from a drawing instruction stream that create a bit-map when executed, wherein performing the analysis corresponding to the sequence of drawing commands comprises classifying each of the commands into groups as each of the sequence of drawing commands are examined in sequence; and
generating a set of image segments that group drawing commands from the sequence together for encoding, each image segment grouping one or more drawing commands to be encoded as a separate image based on drawing command type, where each of a plurality of different drawing command types is defined, at least in part, on a corresponding drawing command opcode, determined from the analysis of the sequence of drawing commands, wherein the generated set of image segments having one of a plurality of different encoding methods selected for each image segment in the set to achieve a highest level of compression with a least amount of distortion, the selection based on a drawing command type associated with each image segment, wherein generating the set of image segments further comprises:
  generating a first bitmap for a first of the groups of one or more drawing commands,
  saving the first bitmap when the all drawing commands in the first group have been analyzed, and
  creating a second bitmap for a second of the groups of one or more drawing commands.

24. The computer readable storage medium defined in claim 23 wherein generating the set of image segments is based on analysis of the drawing commands themselves.

25. The computer readable storage medium defined in claim 23 wherein generating the set of image segments is based on results of the sequence of drawing commands.

26. The computer readable storage medium defined in claim 23 wherein each of the set of image segments comprises a set of bitmaps.

27. The computer readable storage medium defined in claim 23 further comprising:
selecting an encoding method for each of a plurality of image segments; and
encoding each of the plurality of segments with a selected encoding method to produce a set of encoded image segments.

28. A computer-implemented method comprising:
performing an analysis corresponding to a sequence of drawing commands to generate a plurality of image segments that group drawing commands from the sequence together for encoding by groups as separate images, each image segment grouping one or more drawing commands to be encoded as a separate image based on drawing command type, where each of a plurality of different drawing command types is defined, at least in part, on a corresponding drawing command opcode, determined from the analysis of the sequence of drawing commands, wherein performing the analysis corresponding to the sequence of drawing commands comprises classifying each of the commands into groups as each of the sequence of drawing commands are examined in sequence, and further comprising:
- generating a first bitmap for a first of the groups of one or more drawing commands,
- saving the first bitmap when the all drawing commands in the first group have been analyzed, and
- creating a second bitmap for a second of the groups of one or more drawing commands; and selecting an encoding for each of the plurality of image segments based on the analysis corresponding to a sequence of drawing commands, wherein one of a plurality of different encoding methods is selected for each image segment in the plurality of image segments to achieve a highest level of compression with a least amount of distortion, the selection based on a drawing command type associated with each image segment.

29. The method defined in claim 28 wherein selecting an encoding for each of the plurality of image segments is based on which encoding produces the best compression.

30. The method defined in claim 28 wherein selecting an encoding for each of the plurality of image segments is based on impact of each of the sequence of drawing commands in a region represented by said image segment.

31. An apparatus comprising:
a processor configured to control:
means for performing an analysis corresponding to a sequence of drawing commands from a drawing instruction stream that when performed create an image, wherein the means for performing the analysis corresponding to the sequence of drawing commands comprises means for classifying each of the commands into groups as each of the sequence of drawing commands are examined in sequence; and means for generating a set of image segments that group drawing commands from the sequence together for encoding, each image segment grouping one or more drawing commands to be encoded as a separate image based on drawing command type, where each of a plurality of different drawing command types is defined, at least in part, on a corresponding drawing command opcode, determined from the analysis of the sequence of drawing commands, wherein the generated set of image segments having one of a plurality of different encoding methods selected for each image segment in the set to achieve a highest level of compression with a least amount of distortion, the selection based on a drawing command type associated with each image segment, wherein the means for generating the set of image segments further comprises:

means for generating a first bitmap for a first of the groups of one or more drawing commands, means for saving the first bitmap when the all drawing commands in the first group have been analyzed, and means for creating a second bitmap for a second of the groups of one or more drawing commands.

* * * * *